April 13, 1943.         H. W. SEMAR                2,316,490
                   GEAR GRINDING APPARATUS
                    Filed March 25, 1942         6 Sheets-Sheet 1
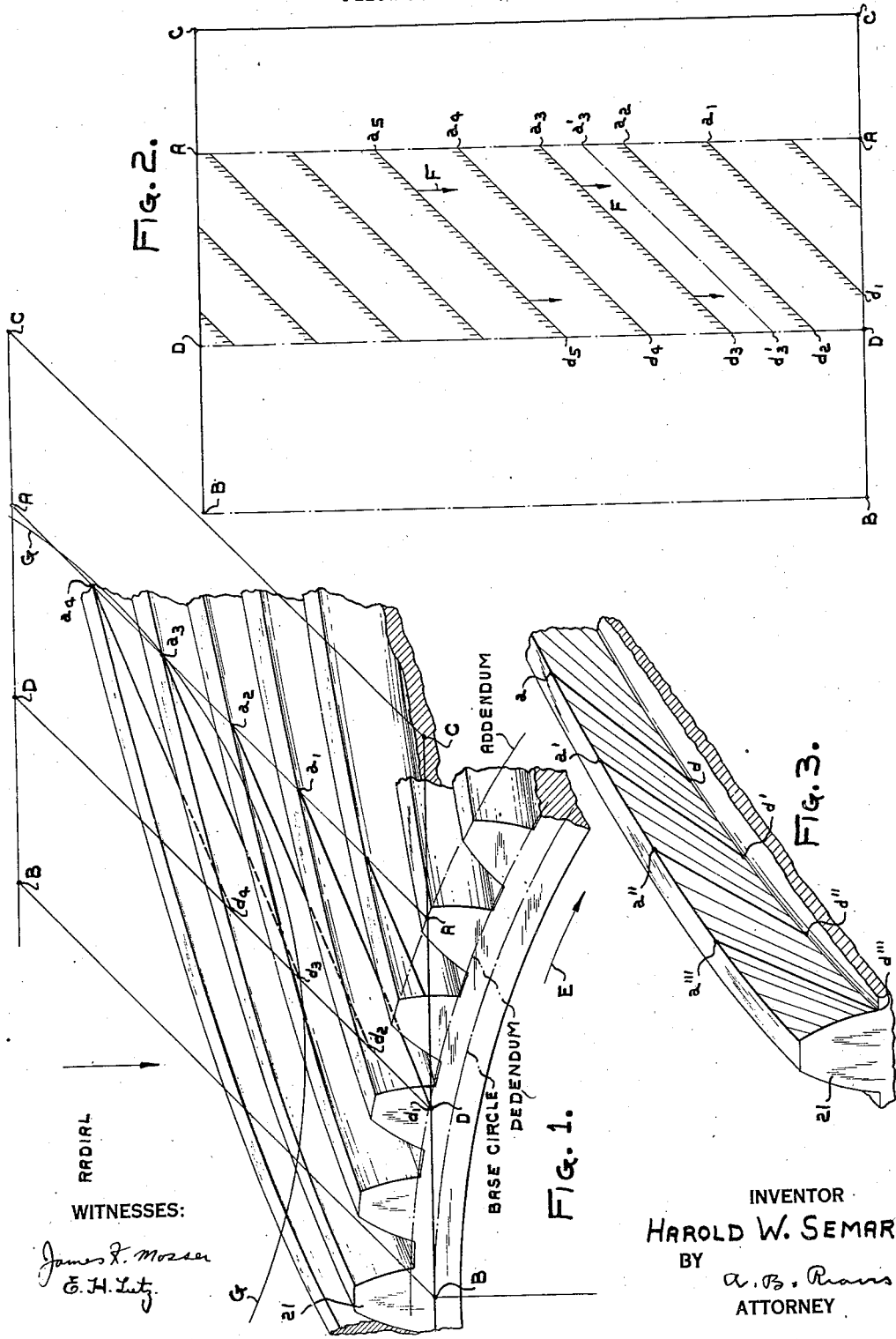
WITNESSES:
INVENTOR
HAROLD W. SEMAR.
BY
ATTORNEY

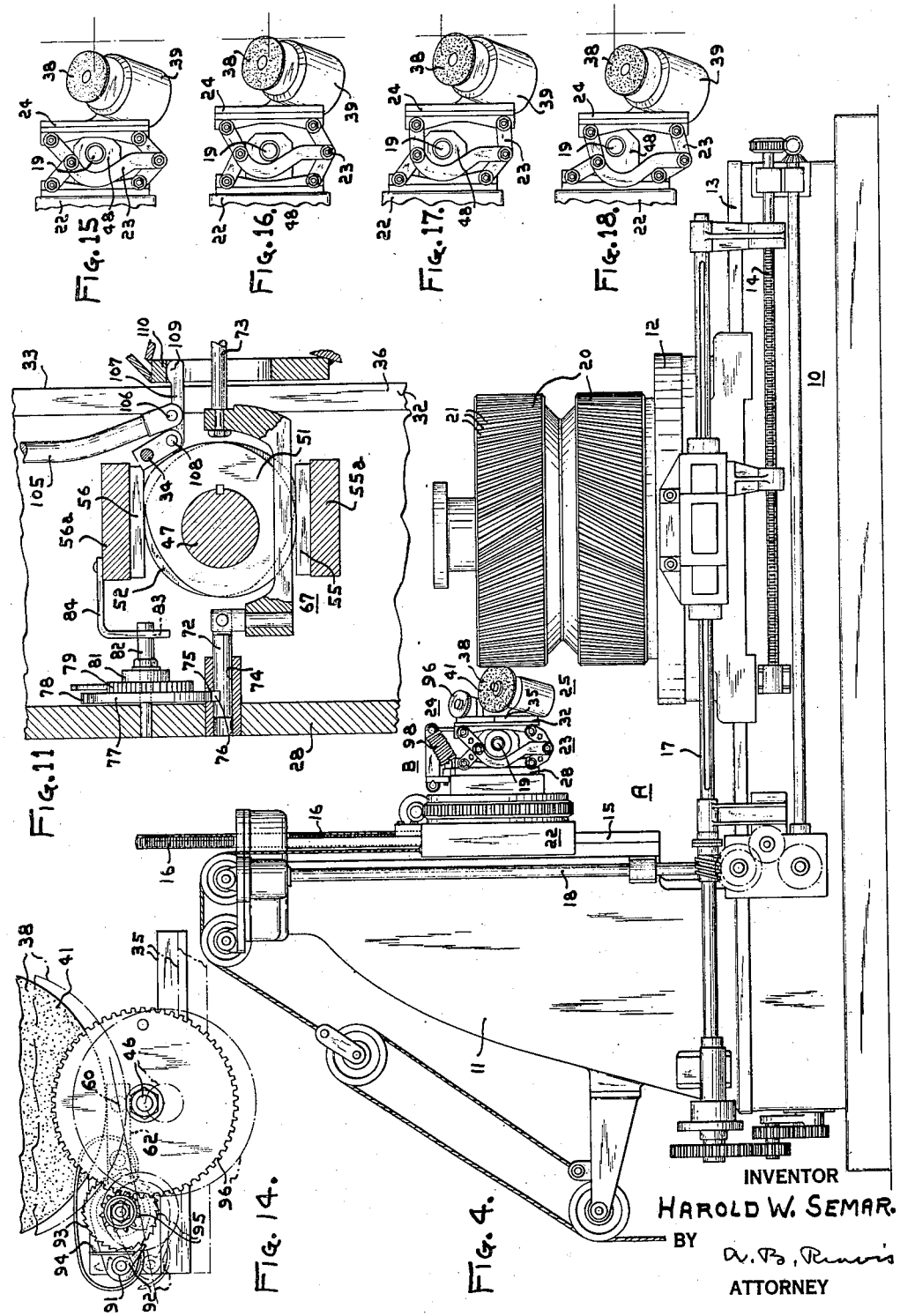

April 13, 1943. H. W. SEMAR 2,316,490
GEAR GRINDING APPARATUS
Filed March 25, 1942 6 Sheets-Sheet 3
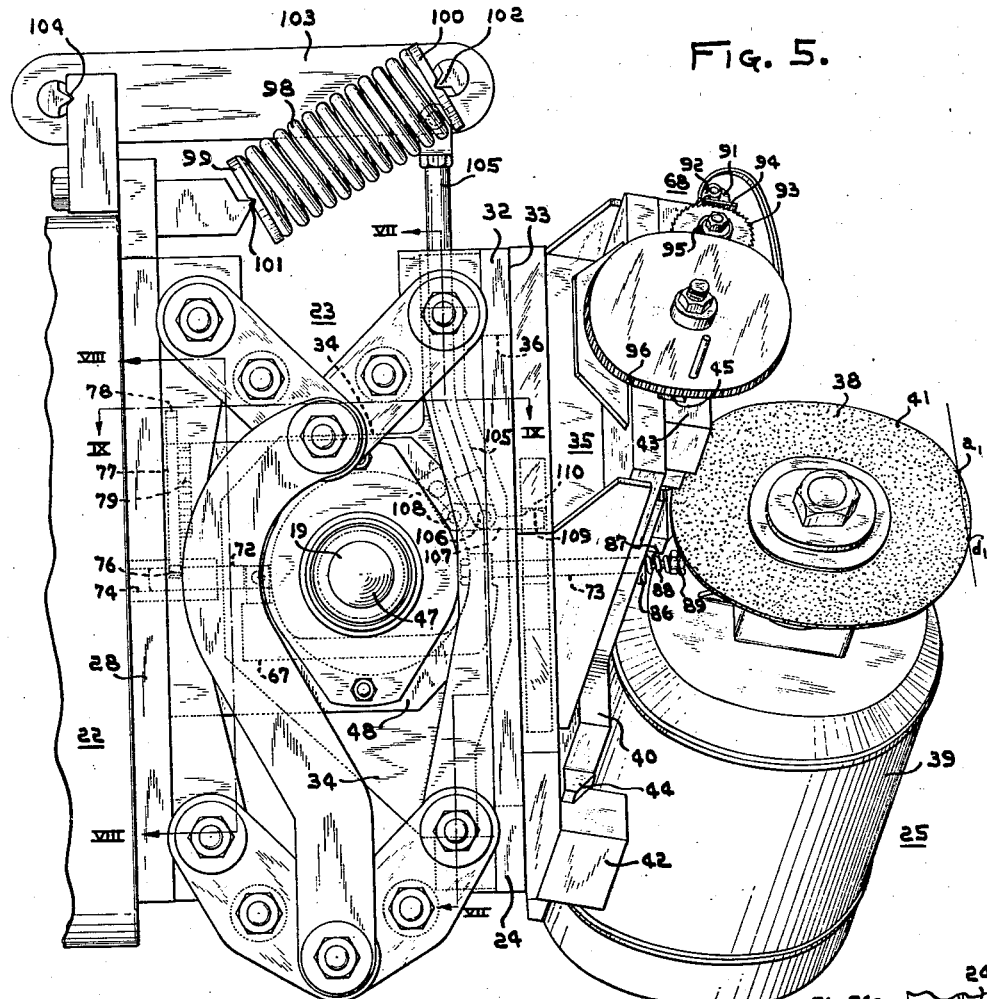
Fig. 5.
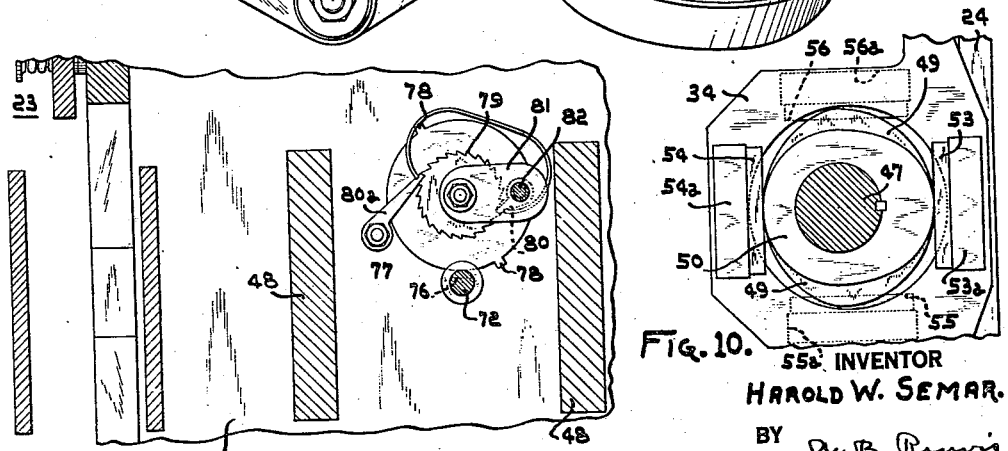
Fig. 8.
Fig. 10.
INVENTOR
HAROLD W. SEMAR.
BY
ATTORNEY April 13, 1943.  H. W. SEMAR  2,316,490
GEAR GRINDING APPARATUS
Filed March 25, 1942  6 Sheets-Sheet 4

INVENTOR
HAROLD W. SEMAR.
BY
ATTORNEY

April 13, 1943. H. W. SEMAR 2,316,490
GEAR GRINDING APPARATUS
Filed March 25, 1942 6 Sheets-Sheet 5
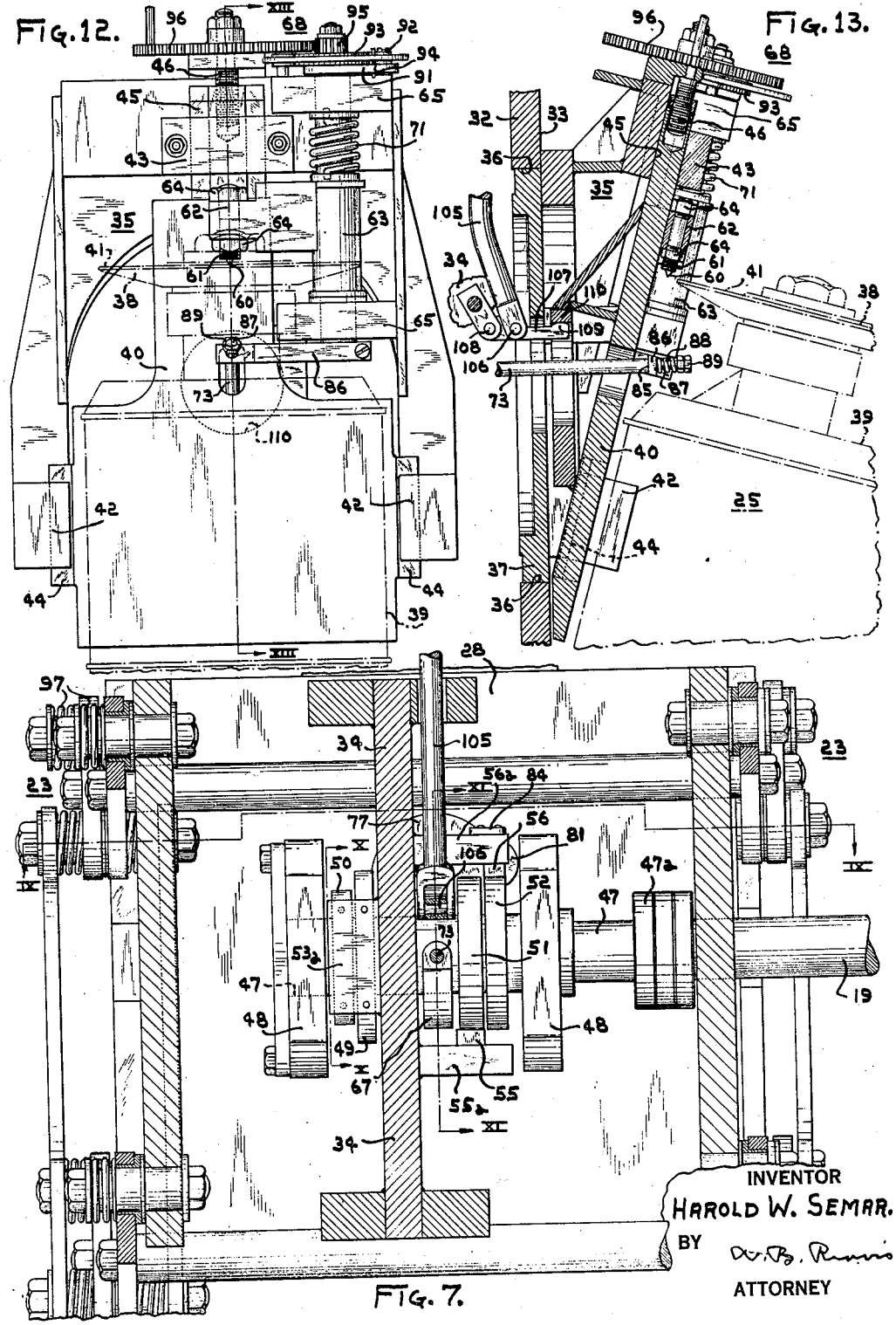
INVENTOR
HAROLD W. SEMAR.
BY
ATTORNEY April 13, 1943. H. W. SEMAR 2,316,490
GEAR GRINDING APPARATUS
Filed March 25, 1942 6 Sheets-Sheet 6

INVENTOR
HAROLD W. SEMAR.
BY
ATTORNEY

Patented Apr. 13, 1943

2,316,490

UNITED STATES PATENT OFFICE 2,316,490

GEAR GRINDING APPARATUS

Harold W. Semar, Drexel Hill, Pa., assignor to Westinghouse Electric & Manufacturing Company, East Pittsburgh, Pa., a corporation of Pennsylvania Application March 25, 1942, Serial No. 436,167

29 Claims. (Cl. 51—56)

The invention relates to gearing and it has for an object to provide for finishing of involute gear teeth by grinding with the result that relatively large gears and pinions may be more accurately and smoothly finished from harder materials than is practicable with conventional hobbing and shaping methods; and, in consequence, for a given size of gear or pinion, the load-carrying capacity may be increased.

In order that gearing used for the transmission of large powers, such as for ship propulsion, may run smoothly and efficiently without wear or rubbing, it is necessary that the faces of meshing teeth shall be generated or formed with a high degree of accuracy; and, to minimize size and weight, the surfaces of the teeth should be as hard as practicable. The present practice is to heat-treat the blank to a hardness within the limit of the machining processes by which the teeth are cut. In accordance with the present invention, instead of finishing the rough-cut blank by machining or hobbing, it is ground, with the result that a greater degree of hardening becomes practicable. Furthermore, grinding is effected in such a way that accuracy of the gear teeth is increased, each finished tooth face being a true involute from end to end.

Grinding of helical teeth is effected by mounting a grinding wheel having a flat, lateral grinding surface, so that the grinding surface is tangent to the helical tooth surface, and correlating the motions of the gear blank and of the grinding wheel so that the latter moves axially with respect to the blank as the latter rotates about its axis, thus sweeping out the involute surface. Accordingly, a further object of the invention is to provide for grinding of helical teeth in this way.

A further object of the invention is to provide for grinding of tooth faces without indexing. In order that this may be accomplished, the grinding wheel has given to it, in timed relation with respect to rotation of the gear being ground, cycles of translatory movement so that it may move or be fed axially of the gear and in grinding relation to a tooth of the latter for a short distance to grind a tooth face increment followed by outward, backward and inward movements to position it for starting a face increment on the like face of the next tooth and so on; and, by feeding the grinding wheel, the convolutions of increments from end to end of the teeth provide uniformly formed ground tooth faces. Preferably, feeding of the grinding wheel is continuous with the result that the increments are formed in helically overlapped relation, in consequence of which grinding may be started at one end of the gear and continued in the step-by-step helical manner to the other end thereof.

These and other objects are effected by the invention as will be apparent from the following description and claims taken in connection with the accompanying drawings, forming a part of this application, in which:

Figs. 1, 2 and 3 are diagrammatic views illustrative of principles of gear tooth grinding herein involved;

Fig. 4 is a side elevational view of the improved gear grinding machine;

Figs. 5 and 6 are enlarged elevational views of the grinding head;

Figs. 7, 8 and 9 are sectional views taken along the lines VII—VII, VIII—VIII and IX—IX, respectively, of Fig. 5, and viewed in the direction of the arrows;

Figs. 10 and 11 are sectional views taken along the lines X—X and XI—XI, respectively, of Fig. 7 and viewed in the direction of the arrows;

Fig. 12 is a plan view of the grinding head construction viewed along a line normal to the grinder axis;

Fig. 13 is a sectional view taken along the line XIII—XIII of Fig. 12;

Fig. 14 is a detail view showing mechanism employed to feed the grinding wheel incident to dressing thereof;

Figs. 15, 16, 17 and 18 are diagrams showing different positions of the grinding head during a cycle of translatory movement of the latter;

Figure 6:
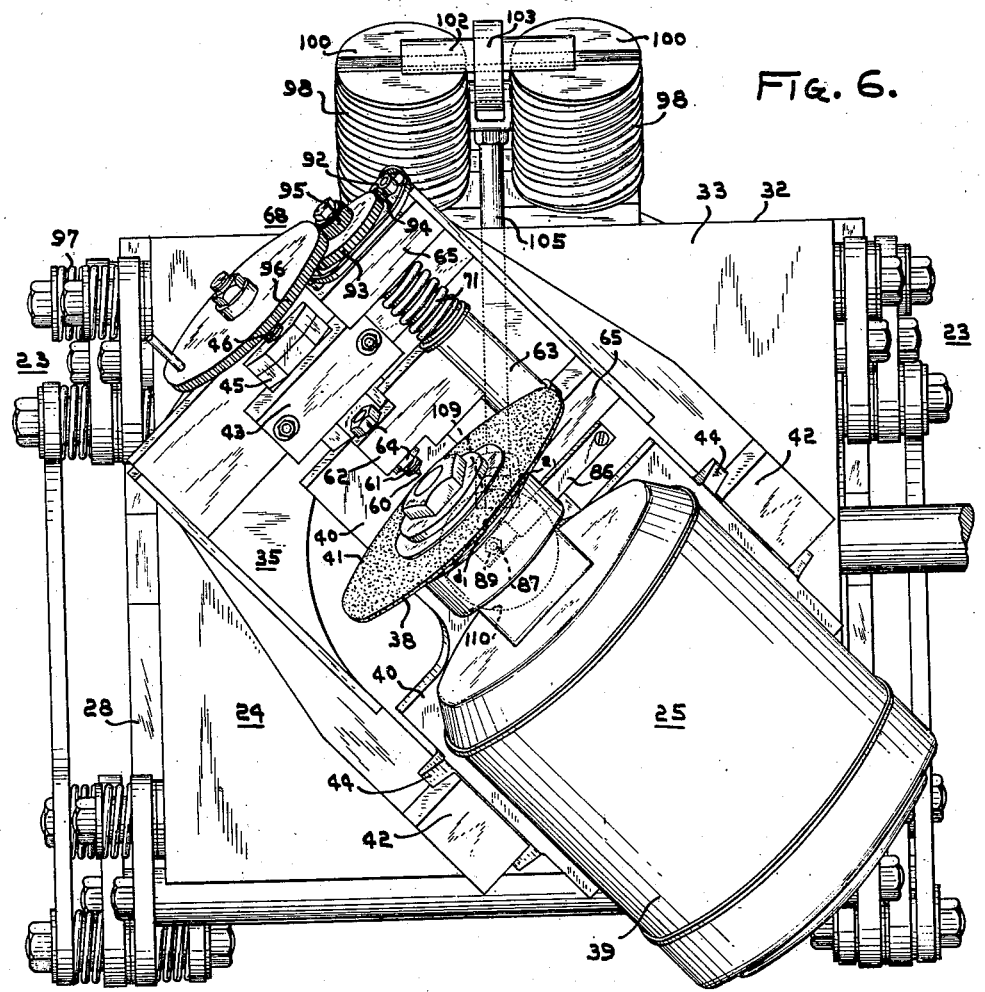

In order that the method and apparatus for tooth grinding may be better understood, reference will first be made to diagrammatic Figs. 1, 2 and 3.

In Fig. 1, there is drawn a portion of a helical involute gear to show the action between the grinding wheel and a gear tooth. The contact between the grinding wheel and the gear teeth takes place in a single plane, which is tangent to the base cylinder of the gear and parallel to the grinder axis. This plane, which may be termed the plane of action, is indicated at BBCC and is tangent to the base cylinder along the line BB. The intersection of the plane BBCC with the helical involute tooth surfaces is a series of straight lines $a_1d_1$, $a_2d_2$, etc. These lines extend between the lines DD and AA which are the intersections of the plane of action BBCC with the addendum and dedendum cylinders, respectively. The periphery of the grinding wheel is indicated by the line GG and is in contact with one of the teeth along the line $a_3d_3$.

Fig. 2 is a view looking in a radial direction at right angles to the plane of action BBCC. If the gear of Fig. 1 is caused to rotate in the direction E at a uniform rate while the plane BBCC remains fixed, the intersections $a_1d_1$, $a_2d_2$, etc., will move axially in the direction F of Fig. 2 at a uniform rate.

If the grinding wheel is moved axially at the same rate that the intersections $a_1d_1$, $a_2d_2$, etc., or contact lines, move axially, it will sweep over the surface at one side of a single tooth.

In Fig. 3, there is shown a single tooth having a tooth face formed by the sweep of the contact line $ad$.

Instead of forming a complete tooth in a single sweep, the present method and machine provide for sweeping a single tooth for a distance of about one-half of the axial pitch, as from $a_3d_3$ to $a_3'd_3'$ in Fig. 2, then the grinding wheel is withdrawn and returned to its initial position at $a_3d_3$ by the time the following tooth reaches the initial position $a_3d_3$ and the cycle is repeated. Thus, in a single sweep of the wheel, a parallelogram $aa'd'd$ (Fig. 3) of the surface is finished. This procedure is continued, the wheel sweeping over similar parallelograms of successive teeth.

In addition to the cyclic motion of the grinder, the latter is fed continuously in an axial direction so that when the grinder makes a complete circuit of the gear and again reaches the starting tooth, it sweeps from $a'd'$ to $a''d''$ (Fig. 3) to finish the parallelogram $a'a''d''d'$ adjoining the first parallelogram. The process is continued until the tooth surfaces at one side of the gear or pinion are traversed, whereupon the grinder and the gear teeth are arranged to effect finishing of the faces of the latter at the other side. While to regard each tooth face as being made up of adjoining parallelograms gives a simple geometric concept aiding in an understanding of the invention, in practice it may be desirable to have more or less overlapping of the parallelograms to assure of the desired uniformity of each tooth face; and, even though overlapping is involved, the tooth faces may still be regarded as comprised by adjoining parallelograms.

In Fig. 4, there is shown a machine A of the hobbing type wherein the conventional hobbing head is replaced by the grinding head B. The machine A includes the usual bedplate 10 and the column structure 11.

The work holder or turntable 12 is carried by the bedplate 10 and guides 13 provide for adjustment thereof, by the feed screw 14, toward and away from the column structure 11 to accommodate gears of varying diameter.

The grinding head B is supported by the column structure 11 and guides 15 provide for vertical adjustment thereof, the head being moved relatively to the guides by means of the feed screw 16.

Power is applied in the usual way to the interconnected driving mechanism of the machine, such mechanism including the shafts 17, 18 and 19. The shaft 17 serves to rotate the turntable 12 by means of worm gearing (not shown) customarily employed for this purpose. The vertical shaft 18 operates suitable gearing to effect desired feeding movement of the feed screw and of the grinding head B. The shaft 19 is used to impart translatory movement to portions of the grinding head as will hereinafter be more fully disclosed.

The turntable 12 is shown as carrying a gear blank 20 having rough-cut teeth 21 which are to be finish ground.

The grinding head B comprises a slide construction, at 22, carried by the guides 15 and connected by a parallel motion mechanism, at 23, to the carriage, at 24, for the grinding unit, at 25.

As shown, the parallel motion mechanism, at 23, is made up of pivotally-connected links which are pivotally connected to the plate 28 of the slide construction and to the carriage or tool support, at 24.

The carriage or tool support, at 24, comprises a main plate 32 to which the parallel motion mechanism is connected and which is arranged parallel to the table axis and normally with respect to the plane of the table or gear member axis which is normal to the path of movement of the slide construction, or at least the supporting surface 33 of such plate is so arranged. A yoke plate 34, arranged at right angles to the plate 32, is attached to the side of the latter facing the plate 28. The plate 32 carries, at its other side, a fabricated structure, at 35 (Fig. 13), for supporting the grinding unit, at 25, so that the axis of the latter is inclined to the surface 33, that is, to a plane parallel to the table axis and normal to the plane of the table or gear member axis which is normal to the path of movement of the guide construction, at an angle corresponding to the gear pressure angle.

Figures 19, 20, 21:
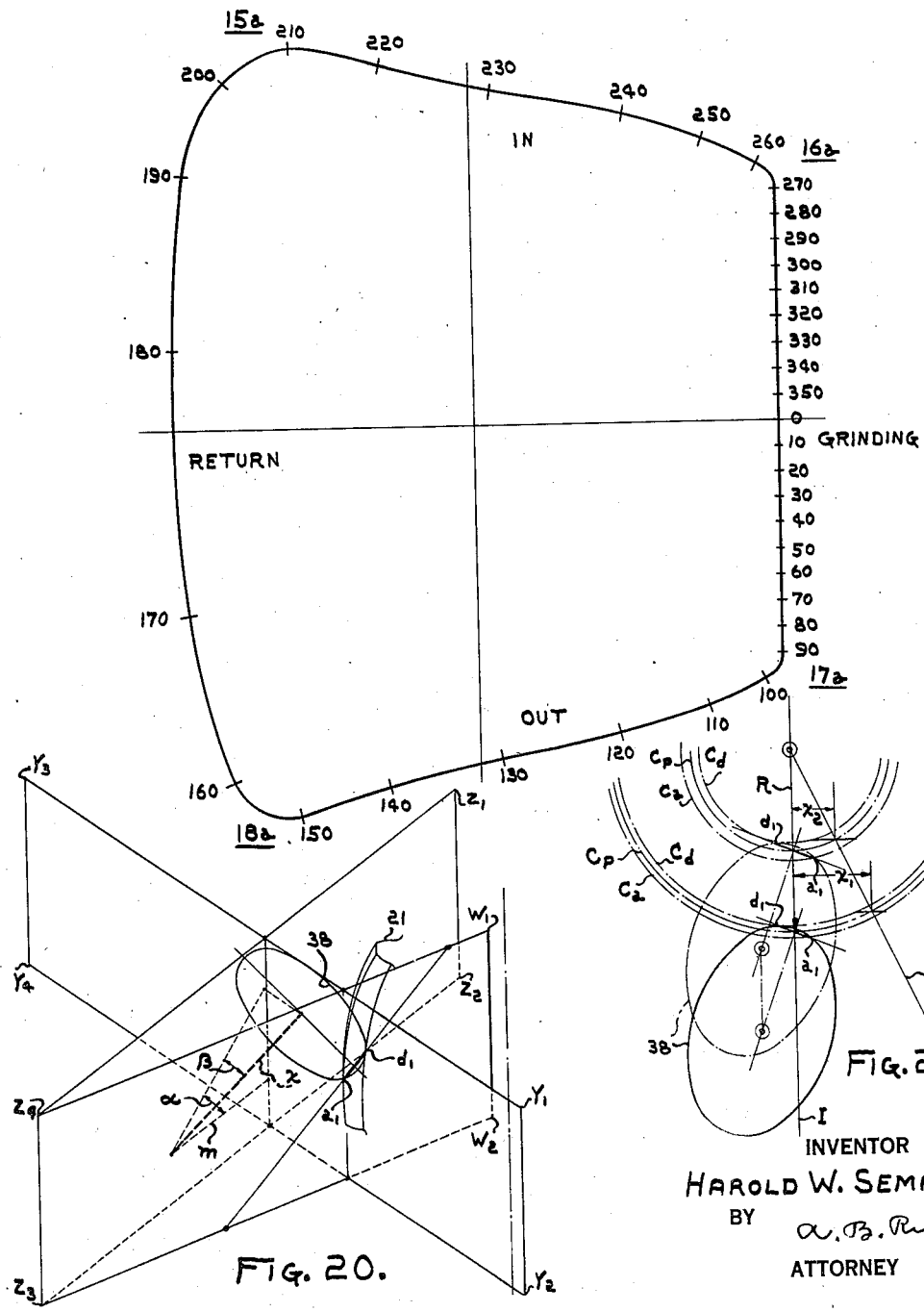
Fig. 19 is a diagram illustrative of each cycle of translatory movement of the grinding head and the relative duration of the phases thereof.
Figs. 20 and 21 are diagrams illustrative of geometric relations involved.

The geometric relation of the grinding wheel axis with respect to other parts will be clear upon reference to diagrammatic Fig. 20, wherein $Y_1Y_2Y_3Y_4$ represents a gear member axial plane normal to the path of feed of the carriage, at 24, and $Z_1Z_2Z_3Z_4$ a plane normal to the first plane and parallel to the gear member axis, the plane $Z_1Z_2Z_3Z_4$ being representative of the position of the surface 33. With respect to a line $m$, in the plane $Z_1Z_2Z_3Z_4$ and normal to the intersections of the planes $Y_1Y_2Y_3Y_4$ and $Z_1Z_2Z_3Z_4$, the grinding wheel axis X is inclined at an angle $\alpha$ dependent upon the gear helix angle, and, with respect to the plane $Z_1Z_2Z_3Z_4$, it is inclined at an angle $\beta$ corresponding to the gear pressure angle. On Fig. 20, the plane $W_1W_2Z_3Z_4$ is the gear and grinding wheel plane of action parallel to the axis X, the grinding chord $a_1d_1$ being in this plane.

The wedge-shaped structure, at 35, preferably has a pivotal connection with respect to the main plate 32 to provide for turning thereof and of the grinding unit carried thereby through an angle of 180° to set the grinding unit for grinding at both sides of the gear teeth. To this end, the plate 32 has a circular opening 36 (Fig. 13) within which fits the pivot portion 37 of the structure, at 35. This pivotal connection provides for setting the wedge-shaped structure to suit the gear helix angle (angle $\alpha$ Fig. 20).

The grinding unit, at 25, comprises a grinding wheel 38 and its driving motor 39 carried by a base plate 40. The grinding wheel has a grinding face 41 in a plane of rotation thereof for finish grinding the gear teeth faces.

In connection with Figs. 1, 2 and 3, it has already been pointed out that a helical involute tooth surface may be regarded as made up of an infinite number of straight lines, each of which is in a base cylinder tangent plane and extends from the addendum to the dedendum circles or cylinders. From this it is evident that the grinding wheel must have contact along such lines and that the grinding face must, therefore, be in a plane of rotation of the wheel to provide a straight chord of contact with a tooth face. While instantaneous contact of the grinding face with a tooth is along such a straight line, yet, due to the feed motion given to the grinding wheel while in this position of contact, the grinding face sweeps along a tooth face for a distance of, for example, about one-half of the axial pitch, to define a tooth surface increment or parallelogram. After completing a surface increment on one tooth, the grinding wheel is retracted, moved backwardly, and then moved inwardly to engage the next tooth. Such translatory movement cycles of the grinding wheel, as hereinafter more fully described, occur in timed relation with respect to rotation of the gear, with the result that tooth face increments are formed on successive teeth in succession. While it would be possible to advance the grinding head a suitable distance between convolutions to provide for tooth faces made up of such increments from end to end of the teeth, preferably, as more fully elsewhere herein described, advance or feeding of the grinding head occurs continuously and concurrently with the translatory movement cycles with the result that the convolutions are disposed helically.

The requirement that the grinding wheel shall sweep along lines each of which is in a base circle tangent plane from the addendum to the dedendum circle may be satisfied with the grinding unit positioned so that the center of the grinding chord falls on the pitch circle at the intersection of the latter with the radius of the gear member normal to the path of feed or the grinding unit may be displaced from that position. The first location is shown at I in Fig. 21 and is diagrammatically represented in Figs. 20 and 21 where the grinding chord $a_1d_1$ (in the base circle tangent plane and extending from the addendum circle $C_a$ to the dedendum circle $C_d$) is bisected by the pitch circle $C_p$ and the radius R of the gear member normal to the path of feed passes through the point of intersection. The second location is indicated at II in Fig. 21. The advantage for the first location is that gear members of varying diameters may have the teeth thereof finish ground without it being necessary to make adjustments of the grinding head. On the other hand, if the grinding line or chord is located eccentrically, or at one side of the gear member radius normal to the path of feed, then it is necessary to adjust the grinding head whenever a gear of different diameter is to be finished. In position II, it will be noted that the intersection of the grinding chord with the pitch circle is spaced a distance $x_1$, $x_2$, etc., from the gear member axial plane normal to the path of feed and that this distance varies for gears of varying diameters. As shown, this distance becomes less as the gear diameter is decreased. With the grinding wheel in position I, this distance or dimension is zero in consequence of which variations in gear diameter do not necessitate any readjustment of the grinding head.

The wedge-shaped structure, at 35, has a guideway provided by the guide portions 42 and 43, and, as already indicated, the guideway is disposed at an angle to the surface 33 corresponding to the gear pressure angle (angle $\beta$ Fig. 20). The base plate 40 has slide portions 44 and 45 cooperating with the guide portions 42 and 43, respectively. A feed screw 46 carried by the structure, at 35, and fixed axially by the latter, serves to position the base plate with respect to the guideway for the purpose hereinafter described.

A cam shaft 47 is carried by bearings 48 provided on the plate 28 of the slide construction, at 22, and it is preferably connected to the drive shaft 19 by a coupling 47a accommodating misalignment.

The cam shaft 47 preferably has mounted thereon four cams 49, 50, 51 and 52 cooperating, respectively, with the followers 53, 54, 55 and 56 attached by lateral arms 53a, 54a, 55a and 56a to the yoke plate 34, the followers, arms and yoke plate constituting a yoke or yoke structure operated by the cams to move the carriage or tool support, at 24, carrying the grinding unit, at 25.

The relationship and operation of the cams and followers will be clear from a consideration of Figs. 10, 11, 15, 16, 17, 18 and 19. Referring to Fig. 10, it will be noted that the followers 53 and 54 are diametrically opposed in a direction normal to the gear member axis and are arranged at right angles to the pair of diametrically opposed followers 55 and 56.

The cams and followers produce translatory cyclic motion of the carriage or tool support, at 24, and the grinding unit, at 25, carried thereby, as follows: The cam 49 and the follower 53 move the grinding wheel from the position shown in Fig. 15 to the tooth face engaging position shown in Fig. 16, this phase of movement from a position outwardly of the gear member to tooth grinding position being indicated from 15a to 16a in Fig. 19; with the grinding wheel retained in grinding position by the cam 49 and the follower 53, the cam 51 and the follower 55 produce the grinding or feeding phase of translatory motion parallel to the gear member axis, as will be clear from Figs. 16 and 17 and is as indicated from 16a to 17a in Fig. 19; at the end of the grinding phase (Fig. 17 and position 17a of Fig. 19) the cam 50 and the follower 54 cooperate to effect an outward phase of movement of the grinding wheel to withdraw the latter from the position shown in Fig. 17 to that shown in Fig. 18, this movement being indicated from 17a to 18a in Fig. 19; and, with the grinding wheel withdrawn from the gear member to the outward position shown in Fig. 18, the cam 50 and the follower 54 continue to hold it in outward position while the cam 52 and the follower 56 cooperate to produce backward or return motion of the grinding wheel from the position shown in Fig. 18 to the initial position shown in Fig. 15, this phase of motion being indicated from 18a to 15a in Fig. 19.

Assuming that the grinding wheel has been moved inwardly into grinding relation with respect to a tooth, then it is fed forwardly while in grinding relation to the tooth being ground for a short distance, for example, one-half of the axial pitch of the teeth, this feeding phase of translatory movement taking place rather slowly, as determined by the design of the involute cam 51. The inward, outward and return phases of translatory movement of the grinding wheel occur relatively quickly due to the character of the cams 50, 52 and 49 and the timing thereof with respect to the cam 51. As may be seen from the cam timing diagram of Fig. 19, the duration of the grinding or feeding phase is approximately equal to the total duration of the inward, outward and return phases, that is, for one revolution of the cam shaft the grinding or feeding phase extends approximately 180°, while the outward, return and inward phases occupy the remaining approximately 180°.

Rotation of the gear blank and translation of the grinding wheel are so correlated or timed that the latter comes into grinding relation with respect to the teeth so as to finish the correct and true involute faces of the latter. Grinding is started at one end of the blank, proceeds from tooth to tooth in a helically convoluted relation of overlapping increments, and, when the other end of the blank is reached, faces at one side of all the teeth will be ground to true involute form. Thereupon, the grinding unit, at 25, and the wedge-shaped structure, at 35, is turned 180°, this being permitted by the pivot plate 37 fitting the opening 36 (Fig. 13), and the faces at the other side of the teeth are finish ground.

As the grinding face 41 wears incident to finishing tooth faces, it must be periodically redressed in such a way that its geometric relation to the apparatus and to the gear member is not changed, that is, the timing of the grinding phases with respect to operation of the apparatus should not be altered. This is accomplished by having the position of the grinding face fixed in relation to the structure, at 35, by means of the trimmer or diamond 60.

As will be pointed out, the diamond 60 may be moved in a plane at right angles to the grinding unit axis from its normal position of rest outwardly of the periphery of the grinding wheel to a position inwardly of the periphery of the latter. Assuming that the trimmer has been moved inward, then, if the grinding unit is fed axially toward the trimmer a small amount, the dressing relation of the parts will be established. Rotation of the grinding wheel, coupled with outward motion of the trimmer, is then responsible for dressing the grinding wheel face 41. The dressing movements are accomplished automatically incident to operation of the machine as will be pointed out.

The diamond 60 is carried by a holder 61 mounted on the arm 62 of the rock shaft 63. The holder may be adjusted with respect to the arm and located in adjusted position by the nuts 64. The rock shaft is carried by bearings 65 attached to the structure, at 35. As the axis of the rock shaft is parallel to that of the grinding unit, it will be apparent that the diamond is movable in a plane normal to the grinding unit axis and it, therefore, serves to fix or determine accurately the position of the grinding face.

Both movement of the trimmer or diamond 60 and movement of the grinding unit, at 25, for dressing of the grinding face, are accomplished periodically and automatically in response to movement of the carriage or tool support, at 24, relative to the slide construction, at 22. To this end, the rock shaft has associated therewith an abutment or push rod structure, at 67 (Fig. 11), and the rock shaft is connected by a ratchet and speed-reducing mechanism, at 68, to said screw 46 for moving the base plate 40 of the grinding unit so as to move the grinding face of the latter toward the trimmer or diamond.

As long as the push rod structure is free to move with the carriage or tool support, at 24, it does so; however, should such movement of the push rod structure be blocked or should such structure be latched against movement, then the carriage or tool support will move relatively thereto, that is, the push rod structure may then be regarded as moving relatively to the carriage or tool support.

If the push rod structure, at 67, is latched with the grinding unit in grinding position and the carriage or tool support, at 24, in extreme inward position with respect to the gear member, it will be apparent that outward movement of the grinding unit and its carriage will result in movement of the rod structure, at 67, relatively thereto to rock the rock shaft against the force of the torsion spring 71 to bring the diamond or trimmer to position inwardly of the periphery of the grinding wheel and to effect the required small amount of feed motion of the grinding unit.

Referring now to the means for latching the push rod structure, at 67, for the above purposes, the latter is provided with rod portions 72 and 73. The rod portion 72 fits in a sleeve 74 carried by the slide construction, at 22. The sleeve has a slot 75 with which a notch 76 of the rod portion 72 is arranged to register when the grinding unit is in grinding position. A wheel 77 is mounted on the slide construction so that its periphery extends into the slot 75 and it has one or more teeth 78 arranged to engage in the notch 76 to latch the rod structure, at 67.

The wheel 77 is turned only when the grinding unit is in grinding position and during its grinding or feeding phase; and, as the notch 76 and the slot 75 register at such times, it will be apparent that the wheel 77 is free to move and bring the tooth 78 into latching position.

The wheel 77 has a ratchet wheel 79 (Fig. 8) attached thereto. Actuating and holding pawls 80 and 80a engage the ratchet wheel and the actuating pawl is carried by the pivoted arm 81 having a lateral pin 82 (Fig. 11) extending through the opening 83 of the plate 84 attached to the cam follower arm 56a. With this arrangement, inward and outward movements of the yoke structure 34 of the carriage or tool support, at 24, merely result in sliding of the plate 84 along the pin 82; however, feeding and return movement phases of the yoke structure result in angular movement of the arm 81. As angular movement of the arm during the grinding phase is used to actuate the ratchet wheel by means of the pawl 80, it is assured that the wheel 77 will be turned only when the slot 75 and the notch 76 register with the grinding unit and the carriage or tool support, at 24, in grinding position or in extreme inward position with respect to the gear member. The ratchet wheel 79 is of such a diameter and the number of wheel teeth 78 is so selected as to secure latching periodically after a predetermined number of translatory movement cycles of the grinding movement.

Assuming that the push rod structure, at 67, is latched, then on the following outward movement phase of the grinding unit with respect to the gear member (17a to 18a of Fig. 19), the rod structure will move relatively to the carriage, at 24; and, as the rod 73 has a shoulder 85 (Fig. 13) abutting the arm 86 attached to the rock shaft, the latter will be moved to bring the trimmer or diamond 60 to dressing position. The rod 73 has a stem 87 extending through an opening in the arm 86 and a spring 88 is arranged between the arm and a nut 89 on the stem, the spring removing any backlash or looseness in the articulated connection between the push rod connection and the arm.

As the rock shaft 63 moves, the arm 91, attached to the outer end thereof (Fig. 14), moves the pawl 92 to actuate the ratchet wheel 93, the extent of actuation being determined by adjustment of the pawl hold-out device 94. The ratchet wheel turns the pinion 95 meshing with the gear 96 carried by the outer end of the feed screw 46 (Fig. 13). In this way, as the diamond or trimmer is brought into dressing position, the said screw is actuated to feed the grinding wheel toward the diamond or trimmer a small amount to establish the desired dressing or trimming relation.

With the diamond or trimmer in its extreme inward position radially in relation to the grinding wheel and the latter fed a small amount toward the diamond or trimmer to establish the desired trimming or dressing relation, traverse of the diamond or trimmer outwardly radially of the rotating grinding wheel, when the grinding unit is moved inwardly (15a to 16a of Fig. 19) will result in full traverse and dressing of the grinding face 41 and the ensuing grinding phase will result in disengagement of the tooth 78 from the notch 75, whereupon the torsion spring is effective to return the rock shaft to normal position with the diamond or trimmer located outwardly of the periphery of the grinding wheel.

Figure 9:
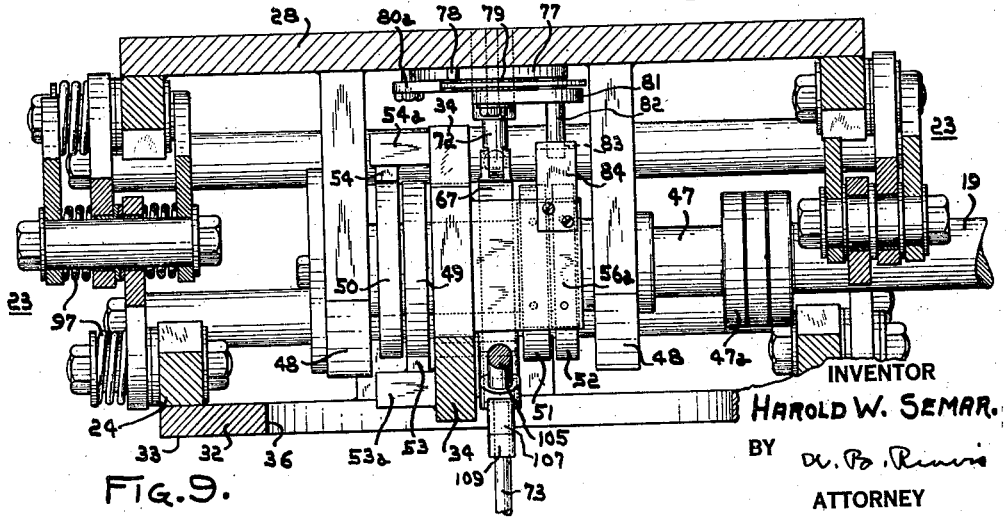

While, as shown in Figs. 7 and 9, the pivot pin connections of the parallel motion mechanism are carefully made and designed in the interest of accuracy, springs 97 are associated therewith to avoid any play or looseness. Also, the spring 98 arranged between the slide construction, at 22, and the movable carriage or tool support, at 24, carrying the grinding unit, serves a counterweight function to balance gravity effects thereon, whereby the cam mechanism is not called upon to sustain gravity load to any substantial extent. Referring to Figs. 5 and 13, the spring 98 is retained in compression between the followers 99 and 100 against which bear the knife edges 101 and 102, the knife edge 101 being fixedly connected to the plate 28 and the knife edge 102 being carried by one end of the link 103, the other end of the latter having a knife edge 104 bearing against a supporting part attached to the slide construction, at 22. With the spring inclined, as shown in Fig. 5, it will be apparent that it exerts force components parallel to the direction of feed and at right angles thereto; and, in order that the component in the direction of feed may be applied to the movable carriage, at 24, as well as to the slide plate 40 carrying the grinding unit, the link 103 is pivotally connected to one end of the link 105, the other end of the latter (Fig. 13) being pivotally connected at an intermediate point 106 to the lever 107, one end of the latter being pivotally attached at 108 to the yoke plate 34 and the other end thereof having an abutment portion 109 engaging an abutment element 110 connected to the slide plate 40. Thus, it will be seen that the spring not only balances the gravity of the load due to the movable carriage, at 24, but it also applies a balancing effect to the slide plate 40 and the grinding unit carried thereby so as to counteract gravity forces which would otherwise be applied to the feed screw 46.

From the foregoing, it will be apparent that there has been provided a gear grinding machine which operates generally like a hob in that the operation is continuous from tooth to tooth without indexing; however, as there is only one grinding surface in a single plane, meshing operation like a hob is not possible and it is necessary to move the grinding wheel translatorily in timed relation with respect to rotation of the gear to remove it from one tooth space and insert it in the next space. Translatory movement takes place in cycles, portions thereof being used to cause the grinding wheel to be positioned in successive tooth spaces and another portion thereof being used to feed the grinding wheel parallel to the gear axis suitably to the helical teeth being ground. While feeding incident to grinding a face increment is effected primarily by a cam, the head construction as a whole is fed by feed screw, with the result that the increments are disposed helically. Hence, in operation, grinding is begun at one end of the gear and proceeds helically in increments from tooth to tooth, and when the grinding wheel leaves the teeth at the other end of the gear, all of the teeth will have had the faces at one side ground from end to end.

More particularly, the aforementioned operations are effected by means of a machine having a rotary table and a carriage for the grinding wheel which is movable in a path parallel to the grinding wheel axis. The carriage has a surface (the surface 33) parallel to the table axis and extending normally with respect to the plane of the table axis which is normal to the path of feed of the carriage. Stated another way, the plane of said surface is arranged normally with respect to a plane of cyclic movement of the carriage containing the table axis. The grinding wheel is supported by the carriage with its axis disposed at an angle to said surface corresponding to the gear pressure angle (the angle $\beta$ in Fig. 20) and the grinding wheel axis is oriented or adjusted angularly about an axis normal to said surface to suit the helix angle of the gear being ground (the angle $a$ in Fig. 20). The last-named adjustment is effected by the pivotal connection of the parts 37 and 32 in Fig. 13. To grind the faces at the other side of the teeth, it is necessary to reverse the gear or the grinder and grind such faces in the manner already described. If the grinder is to be reversed for this purpose, then this may be effected by turning of the pivot member 37 of the grinding wheel supporting structure in the circular opening 36 of the plate 32. As the grinding wheel necessarily wears, it is necessary not only to dress the grinding surface but to keep the latter in correct grinding position. Therefore, the machine is equipped with a trimmer or diamond arranged so that, in all positions, it is in the correct plane for the grinding surface, with the result that, irrespective of the extent of feed, the dressed surface is correctly located. Preferably, the machine includes mechanism periodically operative to move diamond into trimming position and to feed the grinding wheel toward the latter.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a machine for grinding faces on helical involute teeth of a gear member, means for rotating the gear member about its axis, a grinding wheel having its grinding face in a plane of rotation thereof, means for imparting to the grinding wheel movement cycles such that a plane of movement thereof includes the gear member axis and each cycle including a feeding movement parallel to the gear member axis while in grinding relation with respect to a tooth face and withdrawal and return movements incident to disengagement from and engagement with tooth faces at like sides of successive teeth of the gear member, and means for effecting operation of the last-named means in timed relation with respect to rotation of the gear member so that, during each interval when the grinding wheel is in grinding relation with respect to a tooth face, the grinding wheel is fed parallel to the axis of the gear member concurrently with turning of the latter about its axis to effect helical tooth face grinding and, during each interval following withdrawal of the grinding wheel from a tooth space sufficiently to clear the teeth of the gear member, rotation of the latter brings the succeeding tooth space into position for return of the grinding wheel to grinding position in relation to the like face of the succeeding tooth.

2. The combination as claimed in claim 1 wherein the grinding face grinds the tooth faces along lines each of which is in a base circle tangent plane and extends from the dedendum circle to the addendum circle.

3. The combination as claimed in claim 1 wherein the grinding wheel is so disposed that the center of the line of contact of its grinding face with a tooth face is at the pitch cylinder of the gear member.

4. The combination as claimed in claim 1 wherein the grinding wheel is so disposed that its axis is inclined, with respect to a plane parallel to the gear member axis and normal to the plane of cyclic movement containing the gear member axis, at an angle corresponding to the pressure angle of the gear member.

5. The combination as claimed in claim 1 wherein the grinding wheel is so disposed that its axis is inclined to the plane of cyclic movement containing the gear member axis at an angle suitable to the gear member helix angle and is inclined with respect to a plane normal to the first plane and parallel to the gear member axis at an angle corresponding to the pressure angle of the gear member.

6. In a machine for grinding faces on helical teeth of a gear member, supporting means for the gear member providing for rotation of the latter about its axis; a grinding wheel having its grinding face in a plane of rotation thereof; means for supporting the grinding wheel so that when it is in grinding position it effects grinding of a tooth face along lines, in a base circle tangent plane, from the dedendum circle to the addendum circle; means for effecting cycles of translatory movement of the grinding wheel in order that it may be positioned for tooth grinding in successive tooth spaces of the gear member and, when so positioned, in order that it may be fed parallel to the gear member axis to grind increments of tooth faces; mechanism utilizing power supplied to the machine for rotating said supporting means and for operating the means for effecting cycles of translatory movement of the grinding wheel so that operation of the last-named means occurs in timed relation with respect to rotation of the gear member; and means for imparting feeding movement to the grinding wheel in order that the convolutions of tooth face increments may be arranged to provide tooth faces uniformly ground from end to end of the teeth.

7. In a machine for grinding faces on helical teeth of a gear member, means for rotating the gear member about its axis, a support movable parallel to the gear member axis, a grinding unit carried by the support and comprising a grinding wheel and means for rotating it, means carried by the support for effecting cycles of translatory movement of the grinding unit in order that the grinding wheel may be caused to engage with and grind like faces of successive teeth, and means for imparting feeding motion to said support in a path parallel to the gear member axis.

8. The combination as claimed in claim 7 wherein the support includes swivel means to adjust the plane of rotation of the grinding wheel to suit the gear member helix angle.

9. In a machine for grinding helical gear teeth, a rotary table for a gear whose tooth faces are to be ground, a grinding wheel having a lateral grinding face for grinding tooth faces, a carriage for the grinding wheel, means for feeding the carriage in a path parallel to the axis of the table, said carriage having a supporting surface parallel to the table axis and extending normally with respect to the plane of the table axis which is normal to the path of feed, and means for supporting the grinding wheel from the carriage so that its axis is inclined to said surface thereof at an angle corresponding to the pressure angle of the gear being ground.

10. In a machine for grinding helical gear teeth, a rotary table for a gear whose tooth faces are to be ground, a grinding wheel having a lateral grinding face for grinding tooth faces, a carriage for the grinding wheel, means for feeding the carriage in a path parallel to the axis of the table, said carriage having a supporting surface parallel to the table axis and extending normally with respect to the plane of the table axis which is normal to the path of feed, means for supporting the grinding wheel from the carriage so that its axis is inclined to said surface thereof at an angle corresponding to the pressure angle of the gear being ground, and means providing for angular adjustment of the last-named means about an axis normal to said surface to suit the helix angle of the gear being ground.

11. In a machine for grinding helical gear teeth, a rotary table for a gear whose tooth faces are to be ground; a grinding wheel having a lateral grinding face for grinding tooth faces; a carriage for the grinding wheel; means for effecting cycles of movement of the carriage such that each cycle includes a feeding movement phase parallel to the table axis followed by outward, backward, and inward movement phases; said carriage having a supporting surface parallel to the table axis and extending normally with respect to the plane of cyclic movement thereof containing the table axis; means carried by the carriage for supporting the grinding wheel so that its axis is inclined to the supporting surface at an angle corresponding to the pressure angle of the gear being ground; and means for adjusting the supporting means angularly about an axis normal to said supporting surface to dispose the grinding wheel to suit the helix angle of the gear being ground.

12. In a machine for grinding helical gear teeth, a rotary table for a gear whose tooth faces are to be ground; a grinding wheel having a lateral grinding face for grinding tooth faces; a carriage for the grinding wheel; means for effecting cycles of movement of the carriage such that each cycle includes a feeding movement phase parallel to the table axis followed by outward, backward, and inward movement phases; and means operated periodically in response to cycles of movement of the carriage to effect dressing of the grinding face of the grinding wheel.

13. In a machine for grinding helical gear teeth, a rotary table for a gear whose tooth faces are to be ground; a grinding wheel having a lateral grinding face for grinding tooth faces; a carriage for the grinding wheel; means for effecting cycles of movement of the carriage such that each cycle includes a feeding movement phase parallel to the table axis followed by outward, backward, and inward movement phases; said carriage having a supporting surface parallel to the table axis and extending normally with respect to the plane of cyclic movement thereof containing the table axis; means carried by the carriage for supporting the grinding wheel so that its axis is inclined to the supporting surface at an angle corresponding to the pressure angle of the gear being ground; a trimmer mounted on the carriage and having its trimming region located in a plane which is the correct plane for the grinding face in relation to the carriage for the gear being ground; and means operative periodically in response to cycles of movement of the carriage to bring the grinding wheel and the trimmer into trimming relation followed by trimming operation.

14. In a machine for grinding faces on helical teeth of a gear member, means for rotating the gear member about its axis; a support movable parallel to the gear member axis and including first and second members; a feed screw cooperating with the first member for moving the support; said support including parallel motion mechanism connecting the first and second members so that the second member may move parallel to itself and inwardly and outwardly with respect to the gear member; a grinding unit carried by the second member and comprising a grinding wheel and means for rotating it; mechanism carried by the first member and cooperating with the second member for moving the latter to effect cycles of translatory movement of the grinding unit in order that it may be positioned for tooth grinding in successive tooth spaces of the gear member, and when so positioned, in order that it may be fed parallel to the gear member axis to grind increments of tooth faces; said mechanism including a driving member carried by the first member; and means providing for concurrent rotation of the gear member, the feed screw, and said driving member.

15. In a machine for finish grinding of gear teeth, a rotary support for a gear member having teeth to be finish ground; means providing a guideway extending parallel to said support axis; a slide construction carried by the guideway; a carriage having a surface whose plane extends parallel to the rotary support axis and normally with respect to the rotary support axial plane normal to the path of motion of said slide construction; a grinding unit comprising a grinding wheel and a motor for driving it; means for mounting the grinding unit on the carriage so that its axis is inclined to said surface at an angle corresponding to the gear member pressure angle; parallel motion mechanism connecting the carriage to the slide construction; second mechanism for effecting successive cycles of translatory movement of the carriage and the grinding unit carried thereby; each cycle including successive movement phases to bring the grinding wheel from a position outward of the gear member into grinding relation with respect to a tooth thereof, to feed the grinding wheel in a direction parallel to the axis of the gear member while in grinding relation with respect to a tooth of the latter, to move the grinding wheel outwardly from the gear member to clear the teeth of the latter, and then to return the grinding wheel to initial position; and third mechanism for concurrently rotating the support, feeding the slide construction, and operating said second mechanism.

16. In a machine for finish grinding of gear teeth, a rotary support for a gear member having teeth to be finish ground; means providing a guideway extending parallel to said rotary support axis; a slide construction carried by the guideway; a carriage; a grinding unit comprising a grinding wheel and a motor for driving it; means for mounting the grinding unit on the carriage; parallel motion mechanism connecting the slide construction to the carriage; a cam shaft carried by the slide construction; a yoke connected to the carriage; cams carried by the cam shaft and followers cooperating with the cams and carried by the yoke; said cams and followers being constructed and arranged to effect cycles of translatory movement of the carriage and the grinding unit carried thereby; each cycle of translatory movement including successive movement phases to bring the grinding wheel from a position outwardly of the gear member into grinding relation with respect to a tooth thereof, to feed the grinding wheel while in tooth grinding relation in a direction parallel to the gear member axis, to withdraw the grinding wheel from engagement with the gear member, and while free of the gear member to return the grinding wheel to initial position; and mechanism for concurrently rotating the rotary support, feeding the slide construction, and rotating said cam shaft.

17. In a machine for finish grinding of gear teeth, a rotary support for a gear member having teeth to be finish ground; means providing a guideway extending parallel to said rotary support axis; a slide construction carried by the guideway; a carriage; a grinding unit comprising a grinding wheel and a motor for driving it; said grinding wheel having a lateral grinding face; means for mounting the grinding unit on the carriage so that its axis is disposed to position the grinding face suitably to the gear member pressure angle; parallel motion mechanism for connecting the carriage to the slide construction; a cam shaft carried by the slide construction; a yoke connected to the carriage; first, second, third and fourth cams carried by the cam shaft and cooperating with first, second, third, and fourth followers, respectively, carried by the yoke; said first and third followers being diametrically opposed in a direction radial to the gear member and arranged at right angles with respect to the diametrically opposed second and fourth followers; said cams and followers cooperating to produce successive cycles of translatory movement of the carriage and the grinding unit carried thereby; each cycle of translatory movement including successive movement phases in which the first cam and the first follower move the grinding wheel from a position outwardly of the gear member into grinding relation with respect to a tooth thereof with the third cam and the third follower cooperating therewith to fix the grinding relation, the second cam and second follower effecting feeding of the grinding wheel in a direction parallel to the gear member axis while the grinding wheel is maintained in grinding relation by the first and third cams and their cooperating followers, the third cam and its follower effecting withdrawal of the grinding wheel from the gear member, and the fourth cam and its follower cooperating to return the withdrawn grinding wheel to initial position; and mechanism for concurrently rotating the rotary support, feeding the slide construction, and rotating said cam shaft.

18. In a machine for grinding faces on teeth of a gear member, means for rotating the gear member about its axis, a grinding unit including a grinding wheel and means for rotating it, said grinding wheel having a lateral grinding face, means for imparting to the grinding unit translatory movements including feeding movements and withdrawal and return movements incident to disengagement and engagement of the grinding face with successive tooth faces at like sides of successive teeth of the gear member, means for effecting operation of the last-named means in timed relation with respect to rotation of the gear member, and means operative periodically in response to translatory movements to dress the grinding face.

19. The combination as claimed in claim 18 wherein dressing of the grinding face is effected in the correct plane thereof for tooth grinding.

20. In a machine for grinding faces on helical teeth of a gear member, means for rotating the gear member about its axis, a grinding unit including a grinding wheel and means for rotating it, means for imparting to the grinding unit translatory movements including feeding movements and movements away from and toward the gear member incident to disengagement of the grinding wheel from one tooth face and engagement thereof with the corresponding face of the next tooth, means for effecting operation of the last-named means in timed relation with respect to rotation of the gear member to assure disengagement from and engagement of the grinding wheel with like faces of successive gear teeth, a dressing tool having its trimming point located in the correct plane of the grinding face for proper tooth grinding but normally free of the grinding wheel, and means utilizing said translatory movements of the grinding unit toward and away from the gear member to periodically bring the trimming point to trimming position and to feed the grinding unit toward the trimming point so that the grinding face may be dressed and in consequence located in the correct plane for tooth grinding.

21. In a machine for grinding faces on helical teeth of a gear member, means for rotating the gear member about its axis; a grinding unit comprising a grinding wheel and means for rotating it; said grinding wheel having a lateral grinding face; means for supporting the grinding unit so that the grinding wheel, when in grinding relation with respect to a tooth, has its grinding face disposed suitably to the tooth helix angle of the gear member and has its grinding chord in a base circle tangent plane and extending from the dedendum circle to the addendum circle; said supporting means comprising an inner member, an outer member, and parallel motion mechanism connecting the inner and outer members; means cooperating with the inner and outer members for effecting cycles of translatory movement of the outer member and of the grinding unit carried thereby in order that the grinding wheel may be positioned for tooth grinding in successive tooth spaces of the gear member and, when so positioned, in order that it may be fed parallel to the gear member axis to grind increments of tooth faces; said last-named means including a driving member; a screw for feeding said supporting means in order that the tooth face increments may be formed in a helical path to provide tooth faces uniformly ground from end to end of the gear member; a dressing tool; means for mounting the dressing tool on said outer member so that the trimming point is in the correct grinding face plane for tooth grinding and providing for movement of the tool radially of the grinding wheel so that normally it clears the latter and may be moved inwardly for dressing; means for feeding the grinding unit axially to dress the grinding face and secure consequent correct location of the latter; means responsive to inward and outward movements of the outer member with respect to the inner member to render the tool moving means and the grinding unit feeding means effective periodically to dress the grinding face; and means providing for rotation of the gear member concurrently with operation of the driving member and of the feed screw.

22. In a machine for finish grinding of gear teeth; a rotary support for a gear member having teeth to be finish ground; means providing a guideway extending parallel to said support axis; a slide construction carried by the guideway; a carriage having a surface parallel to the support axis and in a plane extending normally with respect to the rotary support axial plane normal to the path of motion of said slide construction; a grinding unit comprising a base plate and a grinding wheel and its driving motor mounted on the base plate; guide means for the base plate; means for mounting the guide means on said carriage so that the guideway provided thereby is disposed at an angle with respect to said surface corresponding to the gear member pressure angle; parallel motion mechanism connecting the carriage to the slide construction; mechanism for effecting successive cycles of translatory movement of the carriage and the grinding unit carried thereby; each cycle including successive movement phases to bring the grinding wheel from a position outward of the gear member into grinding relation with respect to a tooth thereof, to feed the grinding wheel in a direction parallel to the axis of the gear member while in grinding relation with respect to a tooth of the latter, to move the grinding wheel outwardly from the gear member to clear the teeth of the latter, and then to return the grinding wheel to initial position; a trimming tool movable in a plane normal to the axis of the grinding wheel; means for normally biasing the trimming tool to a position which is outward of the periphery of the grinding wheel; means operative in timed relation with respect to said cycles of translatory movement to move the trimming tool to a position which is inward of the periphery of the grinding wheel and then after a desired interval to release it for return to its normal position by the biasing means; means responsive to inward movement of the trimming tool to feed the grinding wheel to engage the latter; and mechanism for concurrently rotating the support, feeding the slide construction, and operating said first mechanism.

23. In a machine for finish grinding of gear teeth; a rotary support for a gear member having teeth to be finish ground; means providing a guideway extending parallel to said rotary support axis; a slide construction carried by the guideway; a carriage having a surface in a plane parallel to the support axis and extending normally with respect to the rotary support axial plane normal to the path of movement of said slide construction; a grinding unit comprising a base plate and a grinding wheel and its driving motor mounted on the base plate; guide means providing a guideway for the base plate; means for mounting the guide means on said carriage so that the guideway is disposed at an angle to said surface corresponding to the gear member pressure angle; mechanism for effecting successive cycles of translatory movement of the carriage and the grinding unit carried thereby; each cycle including successive movement phases to bring the grinding wheel from a position outward of the gear member into grinding relation with respect to a tooth thereof, to feed the grinding wheel in a direction parallel to the axis of the gear member while in grinding relation with respect to a tooth of the latter, to move the grinding wheel outwardly from the gear member to clear the teeth of the latter, and then to return the grinding wheel to initial position; mechanism for concurrently rotating the support, feeding the slide construction, and operating said first mechanism; a rock shaft carried by the guide means and having its axis arranged parallel to the grinding wheel axis; an arm attached to the rock shaft; a trimming tool carried by the arm; means for biasing the rock shaft so as normally to maintain the trimming tool in a position outward radially from the periphery of the grinding wheel; means responsive to inward and outward movements of the carriage periodically to rock the rock shaft against the force of the biasing means to bring the trimming tool to a position a predetermined distance radially within the periphery of the grinding wheel; and means actuated by said rocking movement of the rock shaft to feed the grinding wheel toward the trimming tool a small amount to bring about the desired trimming relation.

24. In a machine for grinding faces on teeth of a gear member, means for rotating the gear member about its axis; a grinding wheel; means for moving the grinding wheel in a circuitous path including grinding movement and return movement phases with the path so arranged that grinding movement phases occur with the grinding wheel in tooth spaces of the gear member and at least portions of the return movement phases occur with the grinding wheel outwardly of the tops of the teeth of the gear member; means for supporting the grinding wheel and the last-named means so that each grinding movement phase occurs so as to grind lengthwise of the teeth of the gear member; mechanism providing for operation of the means for moving the grinding wheel in timed relation with respect to the means for rotating the gear member so that return movement phases may be utilized to place the grinding wheel in successive tooth spaces of the gear member and the grinding movement phases be utilized to grind increments of tooth faces on successive teeth of the gear member; and means for imparting feeding movement to said supporting means and the grinding wheel carried thereby in order that the tooth face increments may occur as convolutions providing tooth faces which are ground from end to end of the teeth.

25. In a machine for grinding faces on teeth of a gear member, means for rotating the gear member about its axis; a grinding wheel; means for moving the grinding wheel in a circuitous path including grinding movement and return movement phases with the path so arranged that grinding movement phases occur with the grinding wheel in tooth spaces of the gear member and at least portions of the return movement phases occur with the grinding wheel outwardly of the tops of the teeth of the gear member; means for supporting the grinding wheel and the last-named means so that each grinding movement phase occurs in a direction parallel to the gear member axis; mechanism providing for operation of the means for moving the grinding wheel in timed relation with respect to the means for rotating the gear member so that return movement phases of the grinding wheel may be utilized to place the latter in successive tooth spaces of the gear member and the grinding movement phases thereof be utilized to grind tooth face increments on successive teeth of the gear member; and means for feeding said supporting means in a direction parallel to the gear member axis so that the convolutions of tooth face increments may be arranged to constitute ground tooth faces extending from end to end of the teeth of the gear member.

26. In a machine for grinding faces on helical involute teeth of a gear member, means for rotating the gear member about its axis; a grinding wheel having its grinding face in a plane of rotation thereof; means for moving the grinding wheel in a circuitous path including grinding movement and return movement phases with the path so arranged that grinding movement phases occur with the grinding wheel in tooth spaces of the gear member and at least portions of the return movement phases occur with the grinding wheel outwardly of the tops of the teeth of the gear member; means for supporting the grinding wheel and the last-named means so that each grinding movement phase is in a direction parallel to the gear member axis with the grinding wheel positioned to grind along straight lines from the dedendum circle to the addendum circle in a plane tangent to the base circle of the gear member; and mechanism providing for operation of the means for moving the grinding wheel in timed relation with respect to the means for rotating the gear member so that return movement phases may be utilized to place the grinding wheel in grinding position in successive tooth spaces and the grinding phases be utilized, with the grinding wheel so placed, to grind tooth faces on successive teeth.

27. The combination as claimed in claim 26 with means providing for angular adjustment of the supporting means to position the grinding wheel to suit the helix angle of the teeth of the gear member.

28. The combination as claimed in claim 26 with means providing for angular adjustment of the supporting means to position the grinding wheel to suit the helix angle of the teeth of the gear member and wherein the supporting means is constructed and arranged to support the grinding wheel suitably to the pressure angle of the teeth of the gear member.

29. The combination as claimed in claim 26 wherein the supporting means, during each grinding movement phase, supports the grinding wheel so that the line of grinding contact of the latter with respect to a gear tooth is intersected by the pitch circle of the gear member at the center of such line of contact.

HAROLD W. SEMAR.